United States Patent [19]

Gibson et al.

[11] 4,410,693
[45] Oct. 18, 1983

[54] PROCESS FOR PREPARING CELLULOSE DERIVATIVES

[75] Inventors: Clark W. Gibson, Denham Springs, Ga.; Carl P. Strange, Walker, La.

[73] Assignee: The Dow Chemical Company, Midland, Mich.

[21] Appl. No.: 407,382

[22] Filed: Aug. 12, 1982

[51] Int. Cl.$^3$ .................. C08B 9/06; C08B 11/02; C08B 11/193

[52] U.S. Cl. .................................. 536/56; 536/60; 536/84; 536/91; 536/95; 536/98; 536/99

[58] Field of Search .................. 536/101, 56, 60, 84, 536/91, 95, 98, 99

[56] References Cited

U.S. PATENT DOCUMENTS

| | | | |
|---|---|---|---|
| 2,490,097 | 12/1949 | Seaman et al. | 536/101 |
| 2,560,391 | 7/1951 | Kleinert | 536/101 |
| 2,783,136 | 2/1957 | Rodgers | 536/101 |
| 3,053,829 | 9/1962 | Yehling | 536/101 |
| 3,498,971 | 3/1970 | Blaga et al. | 536/101 |
| 4,076,934 | 2/1978 | Mills | 536/60 |
| 4,121,922 | 10/1978 | Mackay et al. | 75/34 |
| 4,251,503 | 2/1981 | Swindells et al. | 423/478 |
| 4,270,925 | 6/1981 | Isa et al. | 422/62 |
| 4,284,765 | 8/1981 | Geyer et al. | 536/60 |
| 4,339,574 | 7/1982 | Wüst et al. | 536/101 |

FOREIGN PATENT DOCUMENTS 250617  5/1927  United Kingdom ............. 536/101

*Primary Examiner*—Ronald W. Griffin

[57] ABSTRACT

Cellulose derivatives having a controlled molecular weight are prepared by adjusting oxygen concentration as measured by analyzing the quantity of oxygen in the head space of the reaction vessel to a level such that the cellulose derivative prepared therein has a desired solution viscosity. The cellulose derivative is then prepared in the reaction vessel without substantially increasing the quantity of oxygen in said reaction vessel.

9 Claims, No Drawings

4,410,693

PROCESS FOR PREPARING CELLULOSE DERIVATIVES

BACKGROUND OF THE INVENTION

This invention relates to processes for the production of derivatives of cellulose more particularly to process for preparing cellulose ethers.

In the preparation of many cellulose derivatives, cellulose pulp is reacted with sodium hydroxide to form alkali cellulose. The alkali cellulose is then further reacted with compounds such as alkyl halide, aralkyl halides, alkylene oxides, sodium chloracetate and others to form the desired cellulose derivatives. Alkali cellulose, however, is very susceptible to degradation and the cellulose molecule tends to cleave during processing. Cleavage of the cellulose molecule leads to a lower molecular weight product. This reduction in molecular weight leads to a product which, when in solution, exhibits a low viscosity. An additional problem is that the amount of degradation of the alkali cellulose varies from production run to production run making it difficult to consistently produce a cellulose ether having the desired solution viscosity.

It has been long believed that said degradation of alkali cellulose is due to the reaction thereof with oxygen present in the reaction vessel. However, previous attempts to control the degradation of alkali cellulose by removing the oxygen from the reaction vessel in which the alkali cellulose is prepared and reacted to form cellulose derivatives have failed to give predictable, consistent product viscosities. For example, one commonly used method is to, prior to reacting cellulose pulp with caustic to form alkali cellulose, evacuate the head space of the reactor and then flood the evacuator head space with a gas containing no oxygen. By repeating this process one or more times, it is expected that the amount of oxygen in the head space can be reproducibly controlled to less than about $10^{-5}$ moles/liter of head space, said amount of oxygen varying by less than about 10 percent from production run to production run. Unfortunately, however, products made using this process exhibit vixcosities ranging from 0.5 to 2 times the desired viscosity.

Since it is believed that oxygen degrades alkali cellulose through a free radical mechanism, it has also been attempted to control said degradation through the use of various free radical inhibitors. However, the use of free radical inhibitors does little to control the solution viscosities of the resulting cellulose derivatives.

Because of the fluctuation in the solution viscosities of cellulose derivatives made by known processes, significant time, equipment and expense are required to blend cellulose ether products from different production runs to obtain a final product which is within product specifications. Accordingly, a process whereby cellulose derivatives can be consistently prepared having a predetermined solution viscosity is highly desirable.

SUMMARY OF THE INVENTION

The present invention is such a process for preparing cellulose derivatives having consistent, controlled solution viscosities. In the process of this invention, cellulose derivatives having controlled solution viscosities are prepared by (a) adjusting the quantity of oxygen in the head space of the reaction vessel with direct measurement of the quantity of oxygen in said head space until said quantity of oxygen is such that the cellulose derivative prepared in said reaction vessel has a desired solution viscosity and then (b) preparing the cellulose derivative by reacting cellulose pulp, an alkali metal hydroxide and at least one other reagent in said reaction vessel while excluding the entry of significant amounts of oxygen into said reaction vessel.

By preparing cellulose derivatives according to the process of this invention, surprising and unexpected control of the molecular weights and hence, the solution viscosities of said cellulose derivatives is achieved. In contrast to conventional processes which afford little control over the viscosities of the products, solution viscosities of products prepared according to this invention can be reproducibly controlled to within about 15 percent of the desired viscosity. Because cellulose derivatives can be prepared having controlled solution viscosity by the process of this invention, the additional process step of blending products from various production runs to meet the production viscosity specification can be greatly reduced or eliminated.

DETAILED DESCRIPTION OF THE INVENTION

Control of the concentration of oxygen in the head space of the reaction vessel is critical at all times at which alkali cellulose is present. Thus, the desired oxygen concentration must be obtained in the reaction vessel prior to the reaction therein of the cellulose pulp and the caustic to form alkali cellulose and must be maintained until substantially no alkali cellulose remains.

For the purposes of this invention, the term "reaction vessel" is meant to broadly include any vessels, containers, conduits and the like which may, at any point in the process of preparing cellulose derivatives, contain alkali cellulose. The reaction of cellulose with caustic and other compounds to form cellulose derivatives is generally, but not necessarily, carried out in a single vessel. The process of this invention is equally applicable regardless of the particular vessels, containers, piping and the like which are employed as long as the oxygen concentration in the head space of all said vessels, containers and piping is controlled. For example, in some processes the cellulose and caustic are premixed in tubes before being placed into the vessel in which the final cellulose derivative is prepared. Accordingly, the term "reeaction vessel" as employed herein is intended to include said tubes. Oxygen concentration in the head spaces of said tubes must be controlled as described herein. "Head space" as that term is used herein means any free space in any reaction vessel as that term is defined herein containing air, inert gases, gaseous reactants or vacuum.

The concentration of oxygen in the head space of the reaction vessel is determined by direct measurement of the oxygen using any applicable analytical technique. The factor which must be controlled is the amount of oxygen per unit of head space in the reaction vessel, i.e., the number of moles oxygen per liter of head space. Accordingly, the necessary analytical techniques are those which determine the oxygen concentration in units of moles oxygen per liter of free space or in units which are convertible to moles of oxygen per liter of free space. An exemplary analytical method is the use of a trace oxygen analyzer such as those commercially available which measure the amount of oxygen in a sample in terms of parts oxygen per million parts of the sample. By measuring the pressure in the head space of the reactor, moles of oxygen per liter of head space can be readily determined from the parts per million of oxygen.

The concentration of oxygen suitably present in the head space of the reaction vessel depends on the desired viscosity of the product celulose derivative, the degree of polymerization of the raw cellulose pulp employed, the particular cellulose derivative to be prepared, and like process variables. Generally, a high viscosity product is desired, and the oxygen concentration in the reactor head space is reduced to minimize degradation. In general, the degradation of alkali cellulose can be controllably reduced by adjusting the oxygen concentration in the reactor's head space to a level less than about $10^{-4}$ moles of oxygen/liter (corresponding to a gas containing about 2000 ppm at a pressure of about 1020 mm Hg absolute). Preferably, the oxygen concentration is less than about $10^{-5}$ moles/liter, more preferably less than about $2.5 \times 10^{-6}$ moles/liter (corresponding to a gas containing about 50 ppm at a pressure of 1020 mm Hg absolute). When successive production runs of the cellulose derivative are made, each time adjusting the oxygen concentration in the reactor head space to a consistent level which is within the aforementioned ranges, the solution viscosity of the products of said production runs is controlled to within about 15 percent of the average viscosity of the product of said production runs. Such control of the solution viscosity greatly reduces or eliminates the need to blend the products from various production runs to meet product specifications.

Within the aforementioned, ranges, the optimum concentration of oxygen can be readily determined by one skilled in the art of preparing cellulose derivatives. Moreover, adjustment in the concentration of oxygen in the reactor head space can be used to increase or decrease the amounts of oxidative degradation of the alkali cellulose in order to compensate for fluctuation in other process variables such as the degree of polymerization of the raw cellulose employed.

Lower viscosity products can be prepared by adjusting the oxygen concentration to somewhat higher levels. By adjusting said oxygen concentration to a consistent, predetermined level, the degradation of the alkali cellulose to form lower molecular weight products of consistent molecular weight can be achieved.

The concentration of oxygen is adjusted to the desired level before the cellulose pulp is reacted with caustic and maintained at said level until the alkali cellulose is completely reacted with the other reagents to form the desired cellulose derivative. Although the oxygen concentration in the head space may be periodically or continuously monitored during the course of the reaction, it is generally adequate and preferred to adjust the oxygen concentration in the reactor to the desired level before the cellulose is reacted with the alkali and then prepare the desired cellulose derivative while excluding the entry of significant amounts of oxygen into the reaction vessel. In this manner, continuous or periodic monitoring of the oxygen concentration after the concentration of oxygen is adjusted to the desired level is unnecessary. Adjustment of the oxygen concentration is advantageously accomplished using the techniques described hereinbelow. Most preferably, the cellulose pulp is first charged into the reaction vessel, and the oxygen concentration is then adjusted as desired. The caustic and other reagents are then added as desired while excluding the entry of oxygen and the cellulose derivative is prepared without further monitoring of the oxygen concentration.

The removal of oxygen from the head space of the reaction vessel can be achieved by any suitable means and is considered to be a matter of choice to the practitioner. For example, the air present in the head space of the reaction vessel prior to the start of the reaction can be evacuated therefrom by pulling a vacuum. Once the desired vacuum is attained, the head space can be filled with a suitable gas containing no oxygen. Suitable gases include inert gases such as nitrogen and the noble gases, as well as gaseous reactants such as methyl chloride, propylene oxide or ethylene oxide. This process is repeated as necessary until the concentration of oxygen inside the reaction vessel is adjusted to the desired level.

The oxygen may also be removed while maintaining the pressure inside the reaction vessel at or above atmospheric pressure at all times. In such a removal process, the oxygen-containing reaction vessel is pressurized with an inert gas such as nitrogen or a nobel gas to a pressure of about 2 to about 20 atmospheres and the pressure then released. This process is repeated, each time reducing the quantity of oxygen in the reaction vessel until the desired oxygen concentration is achieved. The aforementioned techniques of removing oxygen from the reaction vessel may be used singly or in combination to achieve the desired oxygen concentration.

After the oxygen concentration is adjusted as desired, the preparation of the cellulose derivative is carried out according to conventional processes. In general these processes comprise reacting caustic with cellulose pulp to form alkali cellulose and reacting the alkali cellulose with the desired reagent to form the desired derivative. The process of this invention is readily adapted to both "dry" and "slurry" processes for preparing cellulose derivatives. In either process, alkali cellulose is prepared and contacted with the desired reagent for about 0.1 to 10 hours at a temperature of about 20° to 100° C. until the desired cellulose derivative is obtained. Upon completion of the reaction of alkali cellulose with the desired reagent to form the desired cellulose derivative and neutralize the alkali cellulose, further control of the oxygen concentration in the reactor is no longer necessary and the product may be exposed to air or oxygen without degradation or loss of viscosity. Alkyl ethers of cellulose such as methylcellulose and ethylcellulose can be prepared in this general manner using the corresponding alkyl chloride such as methyl chloride and ethyl chloride as the reagent. Hydroxyalkyl cellulose ethers such as hydroxyethyl cellulose, hydroxypropyl cellulose and hydroxybutyl cellulose are prepared using as the reagent the corresponding alkylene oxide such as ethylene oxide, propylene oxide or butylene oxide and then neutralizing the product with an acid before exposing to air. In addition, cellulose derivatives such as sodium carboxymethyl cellulose, sodium cellulose xanthate and cyanoethyl cellulose may be prepared having controlled molecular weights according to the process of this invention. General processes for preparing all of the above-mentioned cellulose derivatives are described in "Cellulose Derivatives Ethers" by G. K. Greminger Jr., Encyclopedia of Chemical Technology, 3rd Ed., John Wiley and Sons, New York, 1979 and "Rayon" by R. L. Mitchell et al., Encyclopedia of Chemical Technology, 2nd Ed., 1968.

Cellulose derivatives prepared according to the process of this invention may be suitably employed in all applications for which cellulose derivatives prepared in conventional processes are employed. Because of the excellent control of solution viscosity of products prepared according to this invention, the need to blend products from various production runs to obtain a final product having a solution viscosity within production specifications is greatly reduced or eliminated.

The following examples are provided to illustrate the invention not to limit the scope thereof. All parts and percentages are by weight unless otherwise specified.

EXAMPLE 1

Six samples of methylcellulose (Sample Nos. 1A-1F) are prepared according to the following general procedure. In all examples, the oxygen concentration is adjusted to the level indicated in Table I following.

A 20-pound portion of ground cellulose pulp is placed into a 200-liter reaction vessel equipped with ports for the addition of methyl chloride and concentrated sodium hydroxide solution. The head space of the reaction vessel initially contains air. The reactor is evacuated until the pressure inside the vessel is 30 mm Hg. The reactor is then flooded with nitrogen until the internal pressure is 5 pounds per square inch gauge (psig). The reactor is evacuated and reflooded with nitrogen one or more times until the oxygen concentration in the reaction vessel is at the level indicated in Table I. The oxygen concentration is measured at an internal pressure of 5 psig using a Teledyne Analytical Instruments Ser. No. 317 Trace Oxygen Analyzer. After the oxygen concentration is measured, 40 pounds of a 50 percent by weight sodium hydroxide solution and 30 pounds of methyl chloride are added to the reaction vessel without introducing oxygen or air into the reaction vessel. This mixture is then heated with agitation to about 70°-80° C. for about 3 hours. The reaction vessel is then vented, the product dried and ground. The viscosity of a 2 percent by weight solution of the product in water is measured at 20° C. using an Übbelöde tube.

TABLE I

| Sample No. | ppm $O_2$ (1) | Moles $O_2$/liter ($\times 10^{-7}$) (2) | 2% Viscosity (cps) (3) |
|---|---|---|---|
| 1A | 3 | 1.44 | 24,150 |
| 1B | 5 | 2.40 | 24,860 |
| 1C | 26 | 12.47 | 22,950 |
| 1D | 41 | 19.66 | 20,470 |
| 1E | 88 | 42.20 | 19,120 |
| 1F | 120 | 57.54 | 18,420 |

(1) Parts by weight oxygen per million parts sample. Sample is taken from the head space of the reactor after evacuating the head space to an internal pressure of 30 mm Hg and repressurizing with methyl chloride to 5 psig (1020 mm Hg).
(2) Calculated from the ppm oxygen according to the formula:

$$\text{moles } O_2/\text{liter} = \frac{\text{parts } O_2}{10} \times$$

weight of gases in head space (g/l) $\times \frac{1 \text{ mole } O_2}{32 \text{ g}}$ Because the reactor head space is flooded with nitrogen prior to measuring the $O_2$ concentration therein, the head space contains essentially all nitrogen. Accordingly, the weight of gases in the head space is approximated by the general formula:

wt. gases in head space = density $N_2$ (g/l) $\times \frac{\text{pressure in head space}}{760 \text{ mm Hg}}$ The density of nitrogen is taken as 1.145 g/l in all samples.
(3) Viscosity of a 2 percent by weight solution of the sample in water as measured with an Ubbelode tube at 20° C.

The data in Table I illustrates that the viscosity of the product methylcellulose is inversely proportional to the concentration of oxygen in the reactor. It is apparent that the solution viscosity of the product cellulose ether is controlled to a high degree of precision by controlling the concentration of oxygen in the head space.

EXAMPLE 2

Methylcellulose Sample Nos. 2A-2H are prepared according to the general procedure described in Example 1. A 20-pound portion of ground cellulose pulp is placed into a reaction vessel equipped with a Teledyne Analytical Instrument Ser. No. 317 Trace Oxygen Analyzer and ports for the addition of methyl chloride and concentrated sodium hydroxide solution. The head space is evacuated to the internal pressure indicated in Table II following and then repressurized with nitrogen to an internal pressure of 160 psig. This evacuational reflooding procedure is repeated one or more times until the oxygen concentration inside the reactor is at the level indicated in Table II following. The oxygen content is determined at an internal pressure of 160 psig. After the oxygen concentration is determined, 30 pounds of methylchloride is added to the reaction vessel. To the reaction vessel is then added 40 pounds of a 50 weight percent sodium hydroxide solution. The reaction mixture is then heated to 70°-80° C. for 3 hours. The reactor is then vented, the product dried and ground. The viscosity in the 2 percent aqueous solution is measured in an Übbelöy $\pi$ $\alpha$ ° C. The viscosities are as reported in Table II following.

TABLE II

| Sample No. | Vacuum (1) mm Hg | ppm $O_2$ (2) | Moles $O_2$/liter ($\times 10^{-7}$) (3) | 2% Viscosity (4) |
|---|---|---|---|---|
| 2A | 40 | 0.6 | 2.55 | 19,200 |
| 2B | 50 | 3.0 | 12.76 | 18,400 |
| 2C | 60 | 5.5 | 23.39 | 16,310 |
| 2D | 40 | 6.5 | 27.64 | 15,290 |
| 2E | 30 | 11.0 | 46.78 | 14,410 |
| 2F | 60 | 12.0 | 51.03 | 14,270 |
| 2G | 30 | 20.0 | 85.05 | 11,150 |
| 2H | 60 | 33.0 | 140.33 | 8,810 |

(1) The pressure in mm Hg, in the head space of the reactor after the evacuation of the air initially contained therein.
(2) See Note 1 of Table I. The oxygen in this example is measured at a pressure of 160 psig, (9032 mm Hg).
(3) See Note 2 of Table I.
(4) See Note 3 of Table I.

As is seen from Table II, that the parts per million oxygen do not correlate well to the vacuum drawn on the head space of the reactor prior to loading of the methyl chloride. The reason for this poor correlation is not readily understood. However, the excellent correlation between the parts per million oxygen and the 2 percent viscosity of the product is again seen. Data in Table II clearly indicates that a product methylcellulose having a predetermined 2 percent solution viscosity can be reproducibly prepared by controlling the concentration of oxygen in the head space of the reactor.

What is claimed is:

1. An improved process for preparing cellulose derivatives having controlled solution viscosities wherein said cellulose derivative is prepared in a reaction vessel by reacting cellulose pulp with an alkali metal hydroxide and at least one other reagent which reacts with alkali cellulose to form a cellulose derivative, said improvement comprising (a) adjusting the concentration of oxygen in the head space of the reaction vessel until said quantity of oxygen as measured by analyzing the gases in said head space for oxygen is such that the cellulose derivative prepared in said reaction vessel has a desired solution viscosity and then (b) preparing the cellulose derivative by reacting cellulose pulp, an alkali metal hydroxide and at least one other reagent in said reaction vessel while excluding the entry of substantial amounts of oxygen into said reaction vessel.

2. The process of claim 1 wherein said oxygen concentration is adjusted to a level less than about $10^{-4}$ moles/liter of head space.

3. The process of claim 2 wherein the oxygen concentration is adjusted to a level less than about $1 \times 10^{-5}$ moles/liter of head space.

4. The process of claim 3 wherein the oxygen concentration is adjusted to a level less than $2.5 \times 10^{-6}$ moles/liter of head space.

5. The process of claim 1 wherein the cellulose derivative is an alkyl cellulose.

6. The process of claim 1 wherein said cellulose derivative is a hydroxyalkyl cellulose.

7. The process of claim 1 wherein the cellulose derivative is an alkylhydroxyalkyl cellulose.

8. The process of claim 1 wherein said cellulose derivative is sodium cellulose xanthate.

9. The process of claim 1 wherein said cellulose derivative is a carboxymethyl cellulose.

* * * * *